April 16, 1968     W. J. SMITH, JR     3,377,820

UNIVERSAL JOINT SEAL

Filed Sept. 7, 1966

INVENTOR.
WILLIAM J. SMITH JR.
BY
McNENNY, FARRINGTON, PEARNE & GORDON

ATTORNEYS

United States Patent Office 3,377,820
Patented Apr. 16, 1968

3,377,820
UNIVERSAL JOINT SEAL
William J. Smith, Jr., Bay Village, Ohio, assignor to Cleveland Steel Products Corporation, Cleveland, Ohio, a corporation of Ohio
Filed Sept. 7, 1966, Ser. No. 577,703
13 Claims. (Cl. 64—17)

This invention relates generally to universal couplings and more particularly to a universal coupling having an improved bearing assembly seal.

If excessive wear is to be prevented in universal couplings for extended periods of use, the needle bearing assemblies must be kept adequately lubricated and protected from the ingress of foreign matter. The present invention is directed to a universal joint including an improved seal operable to prevent the egress of the lubricant and the ingress of foreign matter into the bearing assembly. This seal is also arranged to permit periodic relubrication of the bearing to flush out old lubricant and remove any wear particles, or the like.

The problem of providing an adequate seal is especially acute in an automotive universal joint wherein the coupling is constantly subjected to foreign substances, such as dirt, water, and in certain areas salt solutions. Because automotive universal joints or couplings must operate under severe environmental conditions it is difficult to provide a seal assembly which will perform properly and efficiently for extended periods of time with little or no maintenance.

In the past, various forms of seals have been developed in attempts to prolong the operating life of the bearing assemblies. The early seals were designed so that old lubricant within the bearing assembly could be flushed out past the seal during periodic lubrications. However, these prior seal assemblies were not wholly satisfactory because they did not seal with sufficient efficiency and required frequent lubrication. Even with such frequent lubrication foreign matter entered the bearing area and caused wear.

Later attempts were directed toward the development of a permanently lubricated, maintenance free coupling incorporating seals intended to provide substantially perfect sealing. Such couplings were not provided with an external fitting for periodic lubrication and were generally used until worn and then replaced. Relatively rapid wear and resulting failures of these couplings occurred when wear particles accumulated in the bearing assembly even if the seal continued to prevent the ingress of foreign matter. Also, rapid seal wear occurred whenever foreign particles entered the sealing area, since no provisions were made for flushing. Generally, the seals in such "permanently lubricated" couplings utilized compression sealing and flushing could not be performed even if appropriate lubrication fittings were provided.

In a coupling incorporating the present invention the seal functions with sufficient efficiency to permit use for extended periods of time without appreciable loss of lubricant or ingress of foreign particles. However, the coupling can be lubricated to flush out old lubricant, wear particles and foreign matter.

The illustrated embodiment of this invention includes annular seals secured to the cross of the universal joint. Each seal is provided with concentric legs defining an annular channel which receives the open end of the bearing cup. The inner leg is provided with a pair of spaced seal portions in the form of lip seals which engage and seal with the inner surface of the bearing cup. The outer leg is also provided with a flexible seal portion engaging and sealing with the exterior surface of the bearing cup. The illustrated seal provides three separate flexible seal portions in series which cooperate in normal use to effectively prevent any material movement either into or out of the bearing. However, the three seal portions are shaped and arranged so that flow out of the bearing area can occur for flushing purposes when lubricant is pumped into the bearing at the normal lubricating pressures.

The seal is also arranged so that it will properly function for considerable periods of use and can accommodate considerable amounts of seal wear without failure. This is accomplished by arranging each of the seal portions so that initially there is substantial deflection from the unstressed condition. Consequently a considerable amount of wear can occur while still providing proper sealing contact. Also the structure is arranged so that the seal portions have a relatively low effective spring rate. Therefore, excessive pressures are not encountered even though substantial deflections are initially provided.

Improved seal performance is also achieved by arranging the seal portions so that they engage and seal with either an inner or an outer surface of the bearing cup. In the normal manufacture of needle bearings it is necessary to maintain very close radial tolerances and high finishes. Consequently the concentricity of the associated parts is very closely maintained and all seal engaging surfaces are very smooth. Therefore, the seal operates against smooth surfaces which are accurately located and the seal need not flex or deflect to compensate for looseness between the parts and there is a minimum of abrasion to the seal from the surfaces. Because the illustrated embodiment of this invention provides effective sealing, permits flushing, and accommodates substantial wear without failure the coupling has an extremely long, useful life with a minimum of maintenance expense.

It is an important object of the present invention to provide a novel and improved universal joint bearing assembly seal which effectively protects the bearing assembly from the ingress of foreign matter and the escape of the bearing lubricant.

It is another important object of the present invention to provide a novel and improved universal joint bearing assembly seal which permits periodic lubrication of the bearing assembly.

It is another important object of this invention to provide a novel and improved universal joint bearing assembly seal which can be easily manufactured at a relatively low cost and which will satisfactorily function for an extended period of time.

Further objects and advantages will appear from the following description and drawings wherein.

Figure 1:
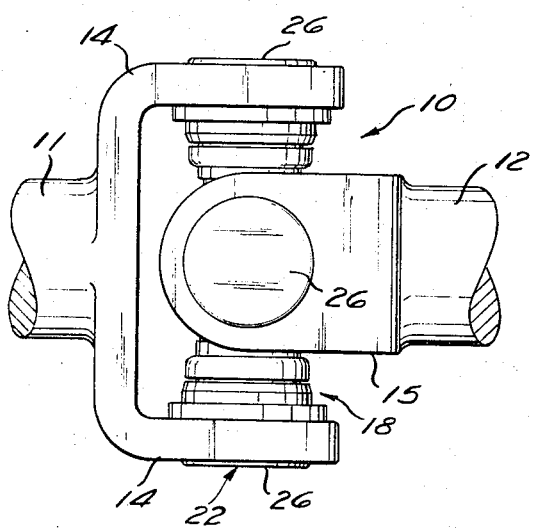
FIG. 1 is a side elevation of a universal coupling.
Figure 2:
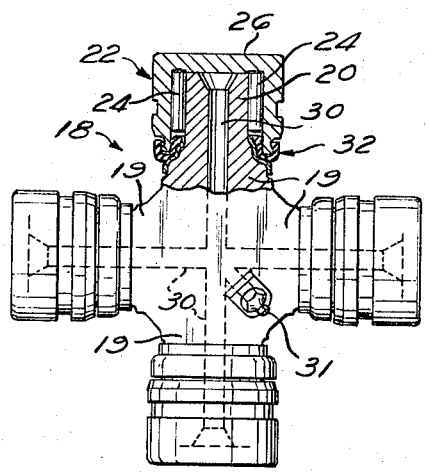
FIG. 2 is a partially sectioned elevation view of a journal cross with the bearing assemblies mounted on the trunnions.

In FIG. 1, a universal coupling 10 is shown interconnecting two rotating members 11 and 12. The coupling 10 includes two sets of laterally spaced yoke arms 14 and 15 secured to the rotating member 11 and 12 respectively and interconnected by a journal cross 18. The journal cross 18 includes a plurality of arms 19 each of which is provided with a trunnion 20 at its outer end portion. Around each trunnion 20 is a bearing assembly 22 composed of a plurality of needle bearings 24 enclosed in a bearing cup 26. The bearing cup 26 forms the outer bearing race of the bearing assembly and together with the trunnion defines a bearing cavity 27 for the needle bearings 24.

Each bearing cup 26 is secured to one of the yoke arms to permit relative rotary oscillation between the trunnion and the bearing cup. Therefore the joint can accommodate misalignment of the rotary members 11 and 12. Simultaneous lubrication of all the bearing assemblies 22 is provided through a pair of cross passages 30 in the journal cross 18 which interconnect the outer ends of the trunnions 20 with an external lubricating fitting 31.

Figure 3:
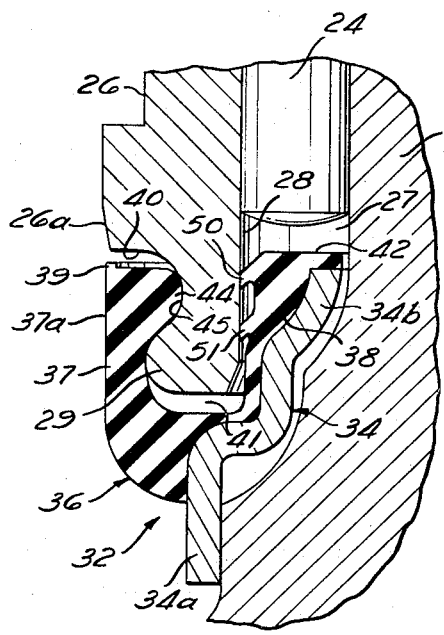
FIG. 3 is an enlarged fragmentary sectional view of the seal assembly of the present invention; and, FIG. 4 is an enlarged fragmentary sectional view of a seal assembly of the present invention having a modified form of needle bearing stop shoulder.
Figure 4:
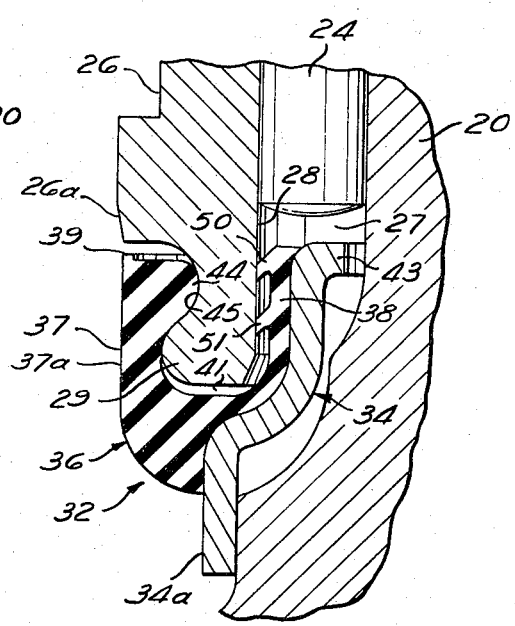

Referring to FIG. 3, the novel and improved bearing assembly seal 32 of the present invention includes an annular retainer member 34, preferably formed from a metal stamping, with an annular elastomeric member 36 bonded thereto. Preferably the seal is formed by positioning the retainer member in a mould and moulding the elastomeric material thereon. The annular elastomeric member 36 has outer and inner annular legs 37 and 38 respectively which define an annular channel 41 in which a reduced end portion 29 of the bearing cup 26 is received. The annular retainer member 34 has its cylindrical end 34a secured to a mating surface on the trunnion 20 as by press fitting. The other end 34b of the retainer member 34 extends longitudinally into the bearing cavity 27 to a point slightly spaced from the inner ends of the needle bearing 24 to provide a stop shoulder which retains and longitudinally positions the bearings within the bearing cavity 27. As shown in FIG. 3 a stop shoulder is formed by a flange 42 of elastomeric material which overlays the end 34b of the retainer member 34. However, as shown in FIG. 4, the longitudinally outer end of the retainer member 34 may be bent over to form a metallic flange 43.

To effectively seal and protect the bearing assembly 22 the elastomeric body 36 is designed with a plurality of seal portions which provide a plurality of sliding seals with the external and internal longitudinal surfaces of the bearing cup 26. The outer sliding seal is formed by the engagement of the outer annular leg 37 with the external longitudinal surface of the reduced end portion 29 of the bearing cup 26. To assure a tight sliding seal between the outer leg 37 and the reduced end portion 29 the unstressed internal diameter of the outer leg is substantially smaller than the external diameter of the reduced portion 29 so that the outer leg is stretched over and resiliently grips the external surface of the bearing cup. The outer leg 37 is provided with a seal portion in the form of an annular bead 44 on its internal surface adjacent the outer end. The bead being received within an annular groove 45 on the external surface of the reduced portion 29 when the outer leg 37 is stretched over the bearing cup. The annular bead 44 serving the dual functions of providing an effective sliding seal with the exterior of the reduced portion 29 and of longitudinally retaining the outer end of the leg 37 on the bearing cup.

It is this seal, formed by the outer leg 37, that functions principally to prevent entry of foreign matter ino the bearing area. When the coupling is rotating, centrifugal force tends to throw dirt or the like out along the bearing cup away from the sealing zone. Therefore the tendency for the dirt to enter the seal is minimized. Also, the end of the outer leg 37 is provided with a longitudinally extending lip 39 which reduces the longitudinal extent of the annular space between the end of the outer leg and the adjacent radial shoulder 40 on the bearing cup 26. By using the longitudinal lip 39 it is possible to reduce the above mentioned space without having to maintain unusually high manufacturing tolerances for the longitudinal length of the outer leg 37. The outer surface 37a of the outer leg 37 also is sized so that when stressed it extends to a position, close to, and is substantially the same diameter as the adjacent outer surface 26a of the bearing cup. This arrangement also tends to prevent any build up of dirt adjacent to the seal.

The inner sliding seal is provided by a pair of longitudinally spaced seal portions in the form of thin flexible lips 50 and 51 extending radially from the outer surface of the inner leg 38. The lips being radially and longitudinally deformed from their unstressed condition by their sealing engagement with the internal longitudinal surface 28 of the bearing cup 26. A number of advantages are obtained by utilizing the internal longitudinal surface 28 of the bearing cup as one of the sealing surfaces for the internal sliding seal. Since this surface forms a portion of the bearing race, it is a smooth ground surface which is accurately located, concentric with the seal, by the needle bearing. Therefore, the lip seals are not required to flex to any substantial degree, during operation and abrasive action upon the lips is minimized. Further, since the lips 50 and 51 engage a longitudinal rather than a radial surface on the bearing cup 26 the axial positioning of the seal assembly is not critical, and the sealing pressure between the lips and the bearing cup surface is dependent upon radial rather than longitudinal dimensions.

Since the sealing pressure for the sliding seals is produced by radially stretching and deflecting the seal portions 44, 50 and 51 on the elastomeric body 36 rather than by radially compressing them into engagement with the bearing cup 26, it is possible to force the old lubricant, wear particles, and accumulated foreign matter past the inner and outer sliding seals by pumping new lubricant through the fitting 31 and pasages 30 into the upper ends of the bearing cavities 27. The new lubricant forces the old lubricant into the lower end of the bearing cavity 27 against the lips 50 and 51 causing the lips to be deffected away from the adjacent longitudinal surfaces of the bearing cup and allowing the old lubricant to flow past the inner sliding seals into the channel 41. As the presure builds up in the channel 41, the outer leg 37 radialy expands slightly allowing the old lubricant to flow past the outer sliding seal and out of the drawing assembly 32.

The initial longitudinal and radial deflection of the lips 50 and 51 during the assembly of the bearing cup and the seal assembly provides a one-way valve which facilitates the flushing of the bearing assembly but resists the ingress of foreign matter. Since the lips are initially deflected in a direction which is longitudinally away from the interior of the bearing cup, they are readily deflected further in this direction and away from sealing engagement wtih the trunnion by the old lubricant as the new lubricant is pumped into the bearing cavity to permit the expulsion of the old lubricant from the bearing cavity. However, the lips tend to be forced in the opposite direction against the inner surface of the bearing cup by the centrifugal force of the rotating coupling and by any substantance tending to pass the lips in the opposite direction; thus, forming a tighter seal with the bearing cup to resist the ingress of foreign matter.

Although preferred embodiments of this invention are ilustrated, it is to be understood that various modifications and rearrangements of parts may be resored to without departing from the scope of the invention as defined in the following claims.

What is claimed is:

1. In a universal coupling including a pair of yokes having laterally spaced arms offset from the axis of rotation of the coupling, a journal cross having a plurality of trunnions, and bearing means surrounding each of said trunnions, means associated with said journal cross for conducting lubricant to each of said bearing means, each of said bearing means including a bearing cup secured to an arm of said yoke, said bearing cup and said trunnion defining a space therebetween, friction reducing means disposed within said space, and seal means disposed about the open end of said bearing cup to retain lubricant within said space, said seal means comprising a retainer having one end disposed within said space and the other end secured to said trunnion, and an annular elastomeric member secured to said retainer member and having inner and outer radially spaced longitudinally extending annular legs defining a channel in which is received the open end portion of said bearing cup, said outer leg being radially outwardly unrestrained and having an internal bead thereon received within a recess on the external longitudinal surface of said bearing cup and said inner leg having a pair of longitudinally spaced radially extending flexible annular lips, said lips being deflected radially inwardly from an unstressed condition into sealing engagement with the internal longitudinal surface of said bearing cup and being so constructed and arranged as to be further deflected radially inwardly away from said internal longitudinal surface to permit lubricant within said space to be forced past said seals upon the application of a lubricant under pressure to said bearing means.

2. A seal assembly for sealing the open end of the bearing cavity defined by the trunnion and bearing cup of a universal coupling, comprising an annular retainer member adapted to be secured to said trunnion and having one end portion adapted to extend within said bearing cavity, and an elastomeric member secured to said retainer and having inner and outer longitudinally extending radially spaced annular legs defining a channel adapted to receive the open end portion of said bearing cup, each of said legs being formed with sealing portions adapted to engage mating longitudinal surfaces on the adjacent part of said bearing cup with such engagement producing radial deflection of said seal portion from its unstressed condition, each of said sealing portions being shaped so that said radial deflection occurs without substantial compression whereby lubricant under pressure within said bearing cup operates to produce further radial deflection allowing the flow of lubricant past said seal portions.

3. A device as set forth in claim 2 wherein said seal portion on said inner leg is provided by a lip, said lip being adapted to be deflected radially and axially by said engagement in a direction away from the interior of said bearing cup.

4. A device as set forth in claim 2 wherein said sealing portion on said outer leg is a radially inwardly extending annular bead adapted to be received within an annular groove on the external longitudinal surface of said lower portion.

5. A device as set forth in claim 2 wherein said one end of said retainer member is overlaid by a flange of elastomeric material.

6. A device as set forth in claim 2 wherein said retainer member is of a material which is relatively rigid as compared to said elastomeric member and said one end portion of said retainer member forms a radially extending flange.

7. A universal coupling comprising a pair of yoke members, a cross member interconnecting said yoke members, said cross including a trunnion portion, bearing means surrounding said trunnion portion and journalling said cross to one of said yoke members including a bearing cup defining an inwardly opening bearing cavity about said trunnion portion, means for conducting lubricant to said bearing means, a seal assembly for closing the open end of said bearing cavity including an elastomeric member sealingly secured to said cross and having inner and outer longitudinally extending radially spaced annular legs defining a channel adapted to receive the open end portion of said bearing cup, each of said legs including sealing portions sealingly engaging the adjacent longitudinal surfaces of said bearing cup and being radially deflected without substantial compression from the unstressed condition of said seal portions whereby the introduction of lubricant under pressure into said bearing cavity produces further radial deflection of said seal portions allowing lubricant to flow past said portions.

8. A device as set forth in claim 7 wherein said outer leg is radially unrestrained and the seal portion thereon comprises an annular bead extending radially inwardly from the inner longitudinal surface of the outer leg.

9. A device as set forth in claim 7 wherein the sealing portion on said inner leg includes an annular lip deflected radially and axially away from the interior of said bearing cup.

10. A device as set forth in claim 7 wherein a longitudinally extending lip is provided on the outer end of said outer leg to reduce the longitudinal extent of the annular space between the bearing cup and the end of the outer leg thereby minimizing the accumulation of foreign matter therein.

11. A device as set forth in claim 7 wherein the stressed outer diameter is substantially the same as the outer diameter of the adjacent portion of the bearing cup to minimize the accumulation of foreign matter adjacent the seal.

12. A device as set forth in claim 7 wherein said means for conducting lubricant to said bearing means comprises an internal passageway in said cross communicating said bearing means and an external lubricating fitting.

13. A device as set forth in claim 7 wherein said seal assembly includes a longitudinally extending retainer member to which the inner periphery of the inner leg is secured, said retainer member being sealingly secured to said cross.

References Cited
UNITED STATES PATENTS

| | | | |
|---|---|---|---|
| 2,773,366 | 12/1956 | Slaght | 64—17 |
| 2,773,367 | 12/1956 | Slaght | 64—17 |
| 3,138,942 | 6/1964 | Kayser | 64—17 |
| 3,218,692 | 11/1965 | Kayser | 64—17 X |
| 3,266,269 | 8/1966 | Stokely | 64—17 |

HALL C. COE, *Primary Examiner.*